(12) United States Patent
Micic et al.

(10) Patent No.: US 8,612,493 B2
(45) Date of Patent: Dec. 17, 2013

(54) ALLOCATION CACHE PREMARKING FOR SNAP-SHOT-AT-THE-BEGINNING CONCURRENT MARK-AND-SWEEP COLLECTOR

(75) Inventors: Aleksandar Micic, Ottawa (CA); Ryan A. Sciampacone, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 396 days.

(21) Appl. No.: 12/261,220

(22) Filed: Oct. 30, 2008

(65) Prior Publication Data

US 2010/0114997 A1 May 6, 2010

(51) Int. Cl.
G06F 12/00 (2006.01)
G06F 12/02 (2006.01)

(52) U.S. Cl.
CPC ........ *G06F 12/0253* (2013.01); *G06F 12/0269* (2013.01)
USPC ............................ 707/813; 707/816; 707/817

(58) Field of Classification Search
USPC .................................. 707/813, 814, 815, 816
See application file for complete search history.

(56) References Cited

U.S. PATENT DOCUMENTS

| 6,049,810 | A * | 4/2000 | Schwartz et al. ...................... 1/1 |
| 6,052,699 | A * | 4/2000 | Huelsbergen et al. ................. 1/1 |
| 6,314,436 | B1 * | 11/2001 | Houldsworth ......................... 1/1 |
| 6,526,421 | B1 * | 2/2003 | Houldsworth ......................... 1/1 |
| 6,622,226 | B1 * | 9/2003 | Dussud ......................... 711/159 |
| 6,804,762 | B1 * | 10/2004 | Dussud et al. ................. 711/170 |
| 6,912,554 | B2 * | 6/2005 | Yuasa ................................... 1/1 |
| 7,197,521 | B2 | 3/2007 | Subramoney et al. |
| 7,249,352 | B2 * | 7/2007 | Fleming et al. ................ 717/162 |
| 7,340,494 | B1 | 3/2008 | Detlefs et al. |
| 7,783,681 | B1 * | 8/2010 | Delsart ......................... 707/813 |
| 7,840,612 | B2 * | 11/2010 | Carmody et al. ............. 707/816 |

(Continued)

OTHER PUBLICATIONS

Bill Venners, Garbage Collection, Dec. 2002, Chapter 9 of Inside the Java Virtual Machine, pp. 1-18.*
Vechev, et al., Write Barrier Elision for Concurrent Garbage Collectors, ISMM'04, Oct. 24-25, 2004.*
Boehm, Hans-Juergen, Space Efficient Conservative Garbage Collection, ACM-SIGPLAN 1993.*
Saiki, et al., Real-time GC in JeRTy VM Using the Return-Barrier Method, IEEE 2005.*
Lo, et al., A Multithreaded Concurrent Garbage Collector Parallelizing the New Instruction in Java, IEEE 2002.*

*Primary Examiner* — Neveen Abel Jalil
*Assistant Examiner* — Kristofer Biskeborn
(74) *Attorney, Agent, or Firm* — Cantor Colburn LLP; Libby Toub (57) ABSTRACT

Tracking newly created objects during a garbage collection cycle includes marking newly allocated objects in the GC cycle during the allocation cache population phase. The goal is to take a high performance system for tracing live objects, such as the mark map, and combine the SATB with a cached allocation system for heap memory such that SATB representation is preserved. Embodiments combine both efficient support for an SATB model during a collection cycle and a highly optimized allocation path for heap objects in an allocation scheme (which may optionally be a size segregated class allocation scheme) that allows both mechanisms to co-exist effectively. Specifically, embodiments track newly created objects during a GC cycle such that they are kept alive during the trace phase while continuing to support a highly efficient allocating caching strategy.

18 Claims, 3 Drawing Sheets

(56) References Cited

U.S. PATENT DOCUMENTS

| | | | |
|---|---|---|---|
| 2002/0147899 A1* | 10/2002 | Lewis | 711/170 |
| 2002/0161792 A1* | 10/2002 | Garthwaite | 707/206 |
| 2004/0040018 A1* | 2/2004 | Fleming et al. | 717/162 |
| 2005/0114413 A1* | 5/2005 | Subramoney et al. | 707/206 |
| 2005/0149585 A1* | 7/2005 | Bacon et al. | 707/205 |
| 2005/0198088 A1* | 9/2005 | Subramoney et al. | 707/206 |
| 2006/0253498 A1* | 11/2006 | Barrs et al. | 707/200 |
| 2006/0288351 A1* | 12/2006 | Detlefs et al. | 718/107 |
| 2006/0294167 A1* | 12/2006 | Borman et al. | 707/206 |
| 2007/0022149 A1* | 1/2007 | Bacon et al. | 707/206 |
| 2008/0281885 A1* | 11/2008 | Dussud | 707/206 |
| 2009/0013320 A1* | 1/2009 | Peterson | 718/1 |
| 2009/0292749 A1* | 11/2009 | Garst et al. | 707/206 |

* cited by examiner

ALLOCATION CACHE PREMARKING FOR SNAP-SHOT-AT-THE-BEGINNING CONCURRENT MARK-AND-SWEEP COLLECTOR

BACKGROUND

The present invention relates to computer programming and execution of computer programs, and, more specifically, to a concurrent mark-sweep garbage collector for use with programming languages such as Java.

Interpreted programming languages such as Java allow software developers to write application code in a platform independent manner. This is typically achieved by having the application program run on a virtual machine (VM), which hides platform differences and provides a set of common application program interfaces (API) for interacting with the native layer. The application program itself compiles down to a series of "bytecodes", which are platform independent and can be translated by the host VM. The VM typically also contains a just-in-time (JIT) compiler, which converts the bytecodes to a dynamically compiled native representation, removing much of the interpretation overhead from the VM.

The VM also typically contains a garbage collector. Garbage collection (GC) is a well-known technique used for automated memory management, and is found in interpreted or scripted programming languages as Java, Ruby and Lisp. Some languages, such as Java, require a garbage collector, as there is no explicit language syntax in Java for managing memory in the object lifecycle. The GC automatically reclaims garbage, or memory, used by objects that will never be accessed or mutated again by the application program. This freeing up of memory performed automatically by the GC spares the programmer from the burden of having to manually manage memory. However, drawbacks to many GC implementations include the unpredictable occurrence and length of pause times in the application to complete the GC process.

Real-time garbage collection (RTGC) focuses on providing short, deterministic pause times with certain levels of guarantees on the rate of interruption and interference of the GC on a running application program. A traditional approach is to break the garbage collection process up into a number of individual pauses in the application program in which the work to complete a GC cycle is performed. These incremental pauses are metered out according to quality of service guarantees between the collector and the application. In an even more advanced system, not all application threads have to be stopped, so that each thread individually decides when to pause and does the metering. Also there could be additional (background) GC threads that run fully concurrent with the application threads, so that interleaving with the application thread is done on the operation system level. This concurrent and/or incremental approach is in contrast to a more standard GC approach, which interrupts the application once for the entire GC cycle in which GC memory reclamation work is started and completed. The technique of stopping the application for the entire GC cycle is typically known as a stop-the-world (STW) approach, which halts the entire Java application while GC work continues and is completed.

Real-time garbage collection typically occurs in small increments, and allows the Java application to run between the increments or concurrently with the increments. Since Java applications are allowed to run, the shape of the heap (i.e., object references to other objects) will change as the application program runs. This requires a tracking/communication mechanism between the Java VM and the GC so that the collector prevents the missing of any objects during its tracing and collecting operations, for example, where the GC thought those objects were live but were in fact dead (e.g., dangling pointers). For performance reasons and determinism in amount of tracing work, RTGC often uses a Yuasa-style snap-shot-at-the-beginning (SATB) style barrier on stores and loads of object references in order to track these changes. The SATB treats the beginning of the collection cycle as a "picture" or "snap-shot" of the heap; that is, everything that is live at that precise moment will survive the collection, and everything that is dead will die. This is similar to a standard STW collector. The SATB uses a write-barrier, which tracks all references written into objects; specifically, it will track objects that are overwritten in order to preserve their "live" status at the start of the GC cycle, and will have the GC process them at some point during the cycle.

Along with having the barrier to keep the SATB view in place, RTGC also keeps track of newly created objects. Since these are created after the SATB, they are viewed as "live" for the duration of that GC cycle, regardless of when they actually die. This means the collector must also have a system for keeping these newly created objects alive that meshes with its standard tracing system. There is another concurrent style of collector that is not based on an SATB approach. Such collector incrementally updates the view of the live object tree, again executing a write barrier, but of a different style. Such collector need not keep track of newly allocated objects, since it is implicitly covered by the incremental update of the live set. This style of the collector is however, not suitable for RTGC environment since it is not as deterministic as the SATB style of collector.

In order to keep pause times low in RTGC, certain concessions are made to the functionality. Compaction of the heap often has the biggest impact on the size and determinism of GC pause times. The purpose of compaction is to reduce/eliminate fragmentation within the object heap, allowing objects of varying sizes to be allocated, and prevent out of memory conditions. Although some RTGC implementations are built to support compaction, there is a cost on throughput speed associated with being able to perform compaction in an incremental manner. As well, it may not be possible to perform the compaction—native references to memory within the heap may prevent an object from being moved, or the increase in length of a GC cycle because the effort of a compaction may result in the heap being completely consumed before the GC process completes. To avoid compaction (and thus fragmentation), an RTGC can make use of a segregated heap that partitions the heap up into size classes for various types of objects. In this case, small holes due to fragmentation are always of a known size (depending on the area of the heap) and so are relatively easily used for allocating objects that fit.

Further, allocation performance is critical to having an effective and successful RTGC, as the garbage collector subsystem has a relatively large effect and is responsible for the speed and method with which objects are procured from the heap. Allocation speed can often be the primary bottleneck of any GC implementation, with the typical problem being lock contention on the free list, though there may be other issues, including path length. The standard solution is to provide a per thread local cache of available heap memory such that a thread can allocate an object in a small number of instructions without contending with other threads.

BRIEF SUMMARY

According to an embodiment of the invention, tracking newly created objects during a garbage collection cycle includes marking newly allocated objects in the GC cycle during the allocation cache population phase. The goal is to be able to take a high performance system for tracing live objects, such as the mark map, and combine the SATB with a cached allocation system for heap memory such that SATB representation is preserved. Embodiments of the present invention combine both efficient support for an SATB model during a collection cycle and a highly optimized allocation path for heap objects in an allocation scheme (which may optionally be a size segregated class allocation scheme) that allows both mechanisms to co-exist effectively. Specifically, embodiments of the invention track newly created objects during a GC cycle such that they are kept alive during the trace phase while continuing to support a highly efficient allocating caching strategy. The method for combining these features is relatively efficient in resource management, reduces instruction counts on allocations, reduces contention on allocations, and provides complete correctness for the barrier during garbage collection.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features and advantages of the invention are apparent from the following detailed description in conjunction with the accompanying drawings in which:

DETAILED DESCRIPTION

Embodiments of the present invention disassociate the process of the marking of newly allocated objects during the tracing phase of a GC process from the allocation of the individual object itself, and move the marking of newly allocated objects into the allocation cache population phase. This reduces the contention on the mark map and allows the allocation path to remain relatively short, fast, and with a cache support. It is also safe to mark the entire allocation cache in advance even though the associated objects are not yet allocated and might not ever be allocated for the duration of the tracing phase. In an embodiment, the GC process runs concurrently with an application program and occasionally interrupts or pauses operation of the application program so that the GC process can complete its task.

Figure 1:
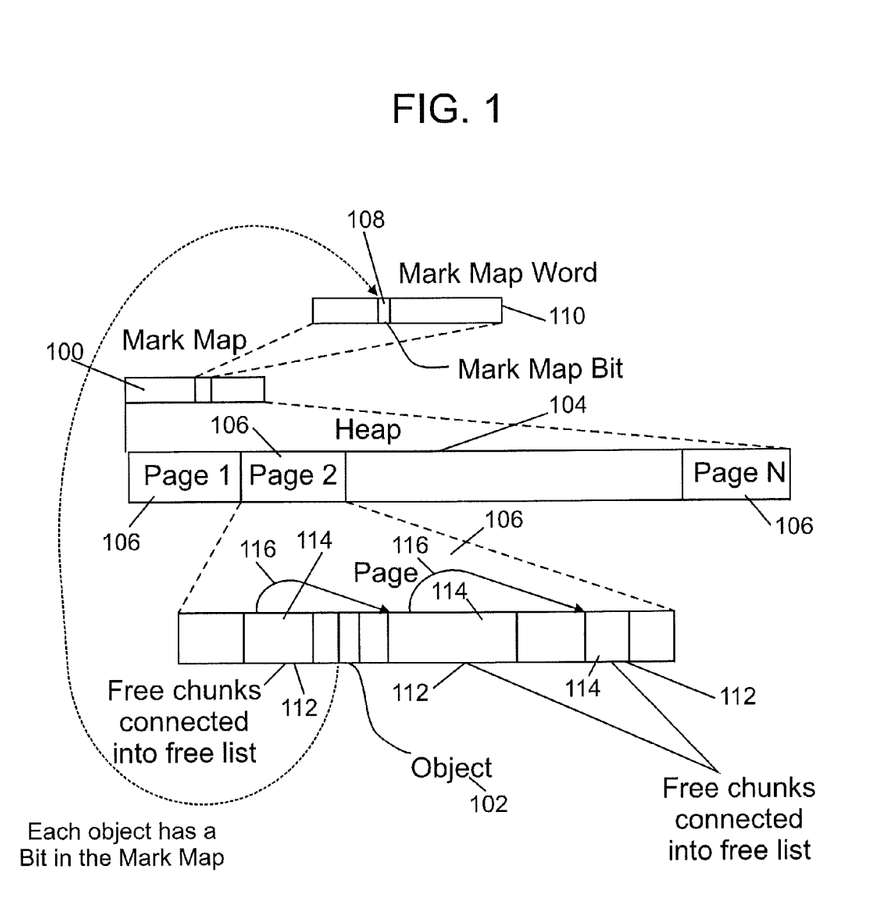
FIG. 1 illustrates an embodiment of the invention showing various features thereof.

Referring to FIG. 1, this is accomplished with three underlying pieces of technology: (1) a mark map 100 to trace through the live object 102 during GC phases; (2) an allocation system with per-thread caching (where the heap 104 may optionally be "size segregated" by dividing the heap into pages 106 each having a specific slot size for allocating objects 102); and (3) an SATB approach to collection that uses a modified Yuasa barrier that requires newly allocated objects 102 to be marked as "live" during GC cycles.

In embodiments of the invention, a feature is focused on population of the per thread allocation cache with cells from the heap allocation system (optionally a size segregated heap allocation system), wherein the mark map 100 is also updated to reflect the fact that all of these cells contain "live" objects, e.g., by setting the bits 108 of a mark map word 110. Thus, objects 102 that are allocated into the cells are already marked as "live" from the viewpoint of the collector, removing the need for allocation paths to handle the marking. As the marking of "live" objects 102 is performed in batch on cache population, any contention optimizations made for the update can be performed at that point, without needlessly adding complexity to the allocation path. The advantage of this is that the mark map arithmetic for setting the cells can be improved, since it is not necessary to repeat the portion of the arithmetic that calculates the mark map bit location for every object 102 that is allocated. This is particularly important if the allocation cache has several objects 102 sequentially stored in memory. The total number of accesses to the mark map memory is decreased, especially the number of accesses that require atomic operations resulting in increased data cache efficiency on the mark map 100, since all of these accesses are relatively close in time (as opposed to when new objects 102 are marked individually). There is no need for JIT code while allocating a new object 102 to be checking if the collector is in tracing phase or not, and if it is, to embed/generate the mark map arithmetic code for accessing the mark bit 108.

Embodiments of the invention may be included in a metronome GC, which is a mark-and-sweep (e.g., incremental) collector that starts a GC cycle pro-actively before an out-of-memory condition is encountered. Once the cycle is started, the work is split into relatively short increments. The execution of the application program and the collector mutually interleave for the duration of the cycle, causing relatively small delays in execution. The live set (live objects 102 at the end of tracing phase) of the metronome collector is determined as a union of (1) all live objects 102 at the beginning of the tracing phase by nearly atomically scanning the complete root set and placing it on the work stack for further recursive tracing. Each object traced is "marked" to be a part of the live set by setting its mark bit 108. Using a Yuasa write barrier, the tracking of objects occurs to whom references have been deleted by implementing a write barrier that first reads and records object fields before they are overwritten. The read value is then preserved for processing by the garbage collector. (2) All newly allocated objects 102 during the tracing phase of the GC cycle. Each newly allocated object 102 is "marked" to be a part of the live set by setting its mark bit 108. This is effectively a snap-shot-at-the-beginning (SATB) approach (i.e., view all live data at the beginning of the collection as live while performing the GC cycle incrementally).

To avoid compaction pauses and better control fragmentation, in an exemplary embodiment the heap 104 may be split into fixed sized pages 106, where each page 106 has a size class from which objects 102 that belong to that size class can be allocated. These size classes are predetermined, and range from a few bytes to a few kilobytes. Each page 106 has one of the size classes associated with it, so that the page 106 is split into fixed sized cells. Objects 102 that can be allocated from a page 106 are smaller or equal than the page size class, but larger than the previous smaller size class. Although there is a range of object sizes that can be allocated, they all consume the same amount of memory in the page 106—the size of a cell (the actual size class value for that page). Unused cells of a page 106 are connected into a single linked free list 112. In a simple implementation, each cell is a single entry in the free list 112.

The mark map is an off heap portion of memory that is used for storing mark bit flags for each of the objects 102 in the heap 104. The mark map 100 is proportional to the heap size, is relatively smaller than the heap 104, with a ratio of 1 bit:16 bytes (1:128), where 16 bytes is the size of the smallest cell. The particular details of the organization of the mark map 100 is not relevant, but some points are: (1) converting from an object address to a mark map bit 108 involves a series of time consuming arithmetic operations (typically involving a few logical "shift" and "and" operations); (2) the mark map 100 is logically a compressed structure, which means that within a single memory word (minimal addressable memory location), there may be more than one mark bit flag. Thus, if several concurrent threads are trying to set the mark bit 108 in the same word 110, an atomic operation (e.g., compare-and-swap) is used, to ensure serializability of the set of operations. Each object 102 that belongs to a live set at the end of the tracing phase has to have the mark bit 108 set prior the sweep process, whether it is an object 102 indirectly referenced through the root set or it is a newly allocated object 102. This is because the information contained in the mark map 100 is not only used for tracing, but also to determine which objects 102 are live and dead, with the dead objects being reclaimed for allocation. The most important benefit of the mark map 100 is in faster sweeping, however, there are memory cache thrashing benefits as well.

During the sweep process, cells that contain objects 102 that are not marked as live (i.e., free cells) are aggregated (coalesced) into free chunks 114, thus potentially creating large contiguous chunks of free memory. These chunks 114 are connected into a free list 112 (for the segregated heap 104, each page 106 having its own free list 112). A free list 112 is later used for allocation, where there might be multiple application threads contending to get a free chunk 114 for a list 112. To create an aggregated free list 12 in a presence of a mark map 100, the collector does not need to access the heap 104 for each cell to realize whether it is a marked object 102, dead object 102 or a free cell already. It only "walks" the mark map 100, and if it sees a long sequence of zeros (i.e., no marked objects 102), it groups the associated heap memory and creates a free chunk 114, accessing the heap 104 only once to write the free chunk header information (typically comprising a pointer 116 to the next free chunk 114 and the size of the chunk 114). The sweep is also responsible for the unmarking process in the presence of the mark map 100, which is significantly faster than the non-mark map solution, again because every live object 102 is not visited.

To decrease the contention of allocation threads on a free list, a thread may be pre-allocated a free chunk 114 that is larger than required to satisfy the current allocation. Since the sweep coalesces free memory, the free chunks 114 in the list 112 are often larger than the size of the allocation request (representing the size of a single object 102). After the large chunk 114 (allocation cache) is pre-allocated, the current object allocation is completed by using the leading cell from the chunk 114. Because this free chunk 114 is local to the thread, the allocation is performed without contention. The remaining free memory of the chunk 114 is kept locally for the thread so that next allocations of that size class can also be performed without contention. Once an allocation cache chunk 114 is exhausted for a particular size class, the thread repeats the process by refreshing with a new free chunk 114. The allocation cache greatly simplifies that base case for allocation (a check for the size class cache being populated and bump of the pointer) that it may be embedded easily into the JIT code, for each allocation site, which leads to a significant improvement in the allocation and overall execution speed. In the segregated heap 104, each thread needs to have an allocation cache for each of active size classes. The technology is applicable in a straightforward manner, but the existing method of individual marking newly allocated objects is suboptimal. Instead of individually marking the allocated objects 102, embodiments of the invention combine the process of cache allocation with the process of marking newly allocated objects 102 to reduce the contention and speed up the allocation path.

Figure 2:
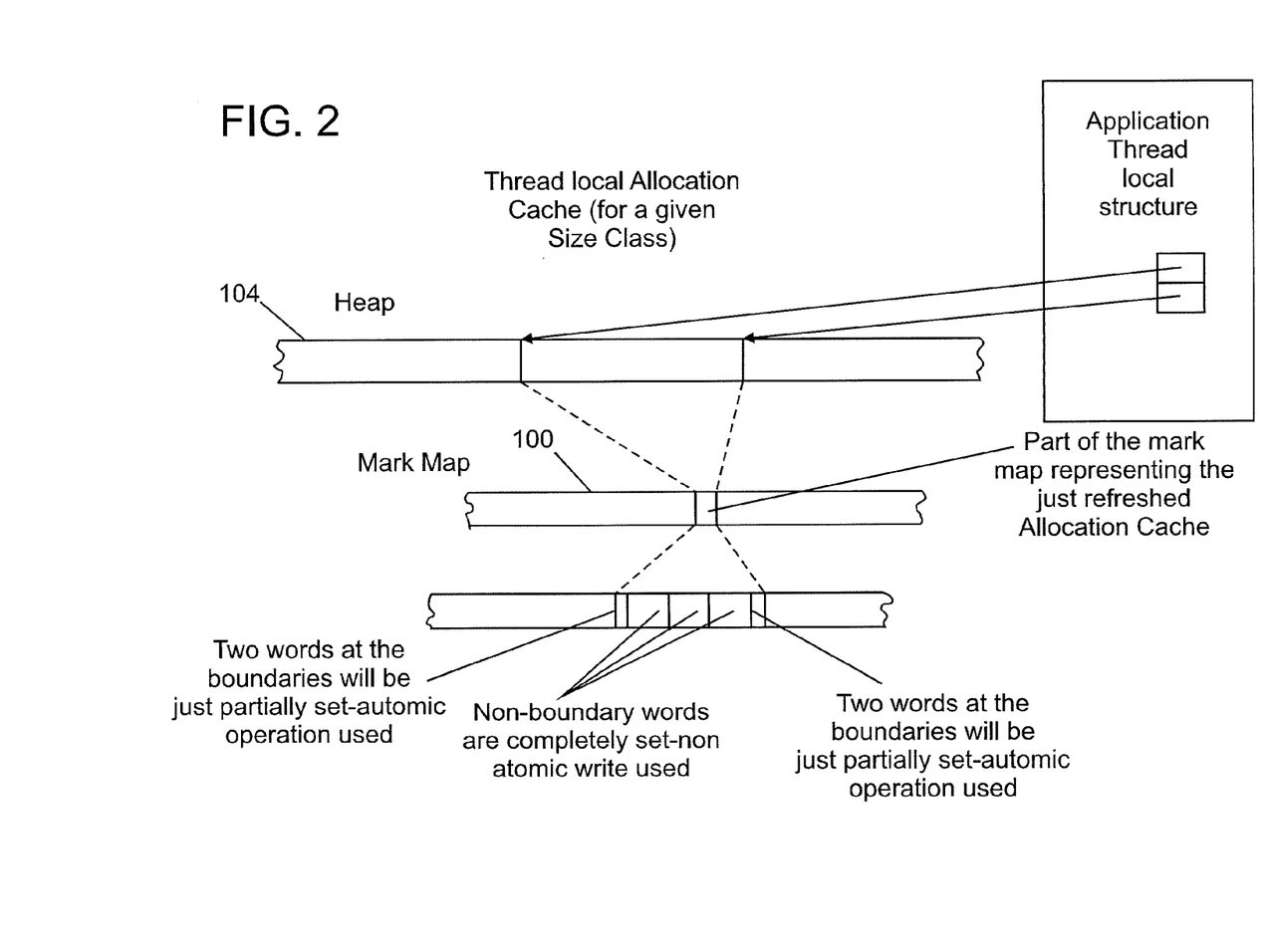
FIG. 2 illustrates details of block pre-marking of an allocation cache.

Referring also to FIG. 2, the implementation requires extending the cache allocation code with cache pre-marking. Pre-marking is done just after the allocation is completed and the boundaries of the allocated memory chunks 114 are known. The implementation of the pre-marking itself contains the code for: (1) finding the boundaries of the mark map 100 associated with the allocated memory chunk 114; and 2) actual setting the bits 108 in the mark map 100 which may require a lock or atomic operation to protect from concurrent modification of the mark map 100.

If the process of pre-marking changes an entire mark map word 110, there is no concurrency issue, since no other threads may possibly change this word 110 as it exclusively belong to the current thread. If the process of pre-marking changes just a part of a mark map word 110 (those on the left and right boundaries of the associated mark map chunk 114), there is a concurrency issue, since the current thread owns only the part of the mark map 100, and there might be other threads owning the remaining parts. An atomic operation or a lock has to be used to ensure serialization.

The tracing GC threads also modify the mark map 100. However, since in the metronome all GC threads are stopped during the program execution (i.e., cache allocation) there is no concurrency issue in this regard. Even in a fully concurrent environment (where multiple, parallel GC threads may contend with application thread on mark map), there is no additional concurrency issue. That is because: 1) parallel GC threads have to use atomic operations to protect from concurrent mark map modifications among themselves; and 2) the GC thread will never modify portions of mark map where there are no live objects (such as those non-boundary mark map words in a thread's allocation cache that are not protect.

The cache allocation is normally already protected by a lock, since more than one thread may be refreshing its allocation cache from the same page. The overlapping words of mark map (at the boundaries of the mark map chunk) may be modified within the lock, and for the rest of the mark map chunk, it is safe to do pre-marking after the allocation is done, i.e., after the allocation lock is released. However, this requires that all of the code for finding the boundaries of the mark map be also within the lock. Since this calculation is non trivial and it is essential to keep the critical section under the lock as short as possible, embodiments of the invention modify even the overlapping words after the lock is released, even though atomic operations are used.

In more details, these are the steps of the pre-marking implementation: When populating the allocation cache with a memory chunk 114 for a particular size class, the low and high addresses of the cached chunk are known. Based on those two addresses and heap-to-mark map mapping, the following is calculated: (1) the address of the low mark map word, and the position of low mark map bit within the word; (2) the address of the high mark map word, and the position of high mark map bit within the word. Depending on the cached chunk size, two cases are distinguished (1) the address of the low word is equal to the address of the high word. In this case only one atomic access (write) to the mark map is required to set all the bits within the word from the low bit to the high bit; (2) the address of the low word is less then the address of the high word. In this case the following accesses to the mark map 100 are required: (1) atomic access to write the low word with all the bits set from low bit to the highest bit in the word (using an OR operation to not destroy previously written mark values); (2) non-atomic access to all words between the low word and the high word, with all bits set; and (3) atomic access to write the high word with all the bits set from lowest bit in the word to the high bit.

At the start of the sweep cycle (after the live object tracing phase has been complete), pre-allocated caches will have unused cells that have their corresponding mark bits set (i.e., live object bit). It is possible to do cache flushing so that those unused cells get their mark bits cleared, since they are not actual objects. However, even if flushing is not done, it will not cause any correctness issues. The collector will think these unused cells are live objects and will not be swept in the current GC cycle. The leak is only temporary up until the next sweep cycle, at which point the unused portion will have mark bits reset (by the previous sweep). If unused portions of the cache are considered large, they optionally can be flushed just before the sweep, so that all mark bits are reset, similar to pre-marking.

Embodiments of the present invention have been described for use with interpreted languages such as Java. However, embodiments of the invention may be utilized in any memory managed language or virtual machine that uses some type of garbage collection technique to manage memory—specifically, to recover memory that corresponds to objects that are no longer in use by an application program. As mentioned hereinabove, a typical virtual machine (VM) hides platform differences and provides a set of common application program interfaces (API) for interacting with the native layer. The application program itself compiles down to a series of "bytecodes", which are platform independent and can be translated by the host VM. The VM typically also contains a just-in-time (JIT) compiler, which converts the bytecodes to a dynamically compiled native representation, removing much of the interpretation overhead from the VM.

Figure 3:
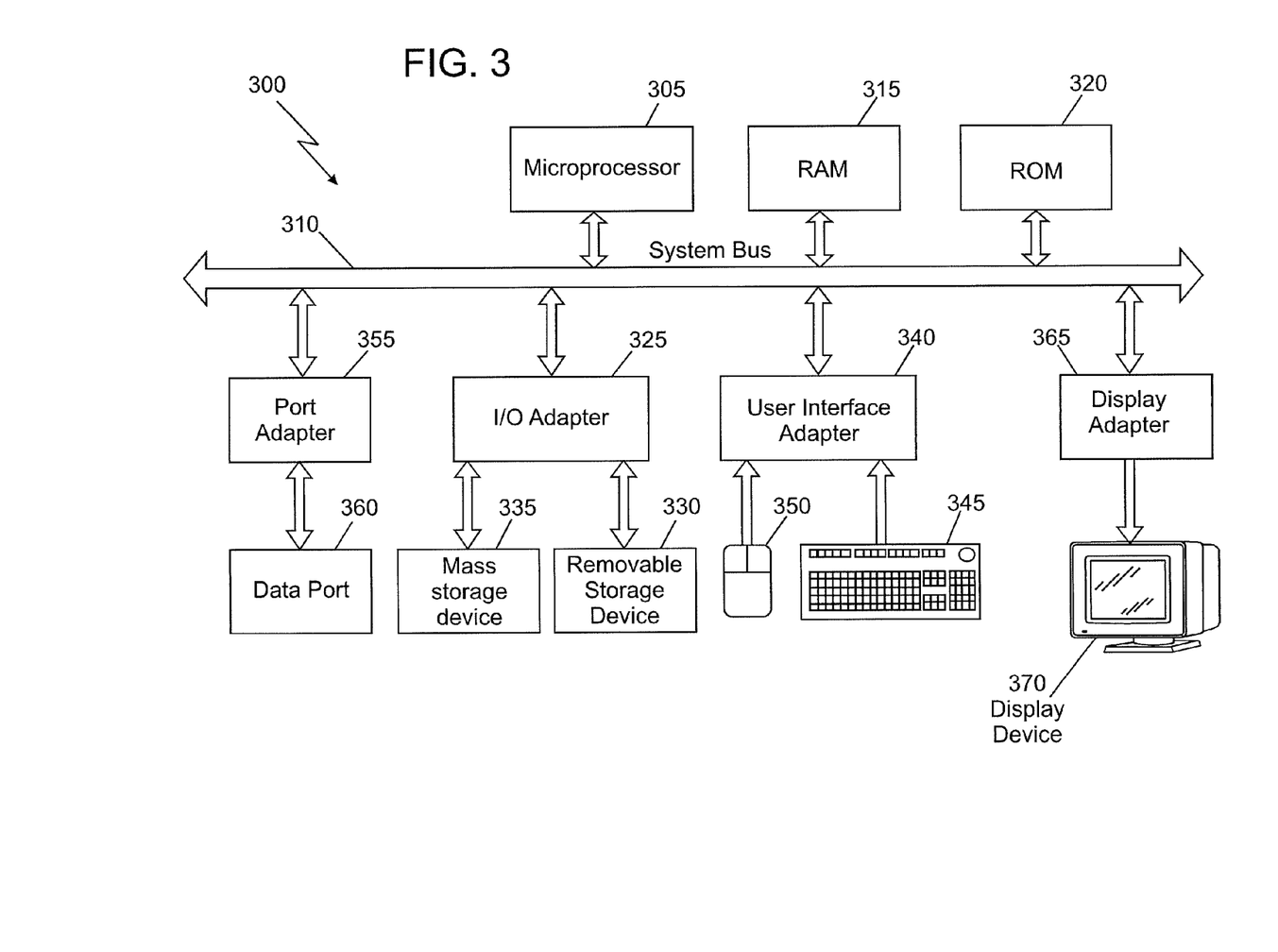
FIG. 3 is a schematic block diagram of a general-purpose computer suitable for practicing embodiments of the present invention.

Generally, method embodiments of the invention may be practiced with a system, for example, a general-purpose computer or a virtual machine, and the methods may be coded as sets of instructions on removable or hard media for use by the system. FIG. 3 is a schematic block diagram of a computer system suitable for practicing embodiments of the present invention. In FIG. 3, computer system 300 has at least one microprocessor or central processing unit (CPU) 305. CPU 305 is interconnected via a system bus 310 to a random access memory (RAM) 315, a read-only memory (ROM) 320, an input/output (I/O) adapter 325 for a connecting a removable data and/or program storage device 330 and a mass data and/or program storage device 335, a user interface adapter 340 for connecting a keyboard 345 and a mouse 350, a port adapter 355 for connecting a data port 360 and a display adapter 365 for connecting a display device 370.

ROM 320 contains the basic operating system for computer system 300. The operating system may alternatively reside in RAM 315 or elsewhere as is known in the art. Examples of removable data and/or program storage device 330 include magnetic media such as floppy drives and tape drives and optical media such as CD ROM drives. Examples of mass data and/or program storage device 335 include hard disk drives and non-volatile memory such as flash memory. In addition to keyboard 345 and mouse 350, other user input devices such as trackballs, writing tablets, pressure pads, microphones, light pens and position-sensing screen displays may be connected to user interface 340. Examples of display devices include cathode-ray tubes (CRT) and liquid crystal displays (LCD).

A computer program with an appropriate application interface may be created by one of skill in the art and stored on the system or a data and/or program storage device to simplify the practicing of embodiments of the invention. In operation, information for, or the computer program created to run, embodiments of the present invention is loaded on the appropriate removable data and/or program storage device 330, fed through data port 360 or typed in using keyboard 345.

In view of the above, the method embodiments may therefore take the form of computer or controller implemented processes and apparatus for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing embodiments of the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing embodiments of the invention. When implemented on a general-purpose microprocessor, the computer program code segments configure the microprocessor to create specific logic circuits. A technical effect of the executable instructions is to implement the method embodiments described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method of keeping newly allocated objects alive in a snap-shot-at-the-beginning (SATB) garbage collection operation, the method comprising:
    running a garbage collection cycle in conjunction with an application program;
    tracing live objects during the garbage collection cycle by utilizing a mark map to identify the live objects, each object being associated with a bit in the mark map, and keeping alive the newly created objects during the step of tracing live objects;
    populating an allocation cache with a memory chunk having a low address and a high address defining the memory chunk having a plurality of objects stored contiguously, the populating including marking and tracking newly created objects during an allocation cache population phase of the garbage collection cycle, the newly created objects being created during the garbage collection cycle, and the allocation cache population phase of the garbage collection cycle including populating the allocation cache with cells from a heap allocation system;
    calculating an address of a low mark map word corresponding to the low address of the memory chunk and a position of a low mark map bit within the low mark map word, the low mark map bit defining the low boundary of the mark map range;
    calculating an address of a high mark map word corresponding to the high address of the memory chunk and a position of a high mark map bit within the low mark map word, the high mark map bit defining the high boundary of the mark map range;
    determining whether the address of the low mark map word is less than the address of the high mark map word; and
    responsive to determining that the address of the low mark map word is less than the address of the high mark map word:
        accessing the low mark map word to update a state of a partial set of bits among the total bits in the low mark map word using an atomic operation, wherein a marked state of a bit indicates a live object;
        accessing each map word arranged between the low mark map word and the high mark map word to set all bits in all mark map words arranged between the low mark map word and the high mark map word as marked using a non-atomic operation; and
        accessing the high mark map word to set a partial set of bits among the total bits in the high map word as marked.

2. The method of claim 1, further comprising:
    determining whether the address of the low mark map word is equal to the address of the high mark map word; and
    accessing the low map word to set each bit in the low map word as marked responsive to determining that the address of the low mark map word is equal to the address of the high mark map word.

3. The method of claim 1, wherein the garbage collection cycle runs concurrently with the application program.

4. The method of claim 1, wherein the garbage collection cycle occasionally interrupts operation of the application program so as to run portions of the garbage collection cycle.

5. The method of claim 1, further comprising allocating the newly created objects within a heap.

6. The method of claim 1, further comprising marking via a modified write barrier that operates according to a snap-shot technique, newly allocated objects as live during the garbage collection cycle.

7. A non-transitory computer-readable storage medium including computer executable instructions that, when executed on a processor of a computer apparatus, direct the processor to perform a method of keeping newly allocated objects alive in a snap-shot-at-the-beginning (SATB) garbage collection operation, the method comprising:
    running a garbage collection cycle in conjunction with an application program;
    tracing live objects during the garbage collection cycle by utilizing a mark map to identify the live objects, each object being associated with a bit in the mark map, and keeping alive the newly created objects during the step of tracing live objects;
    populating an allocation cache with a memory chunk having a low address and a high address defining the memory chunk having a plurality of objects stored contiguously, the populating including marking and tracking newly created objects during an allocation cache population phase of the garbage collection cycle, the newly created objects being created during the garbage collection cycle, and the allocation cache population phase of the garbage collection cycle including populating the allocation cache with cells from a heap allocation system;
    calculating an address of a low mark map word corresponding to the low address of the memory chunk and a position of a low mark map bit within the low mark map word, the low mark map bit defining the low boundary of the mark map range;
    calculating an address of a high mark map word corresponding to the high address of the memory chunk and a position of a high mark map bit within the low mark map word, the high mark map bit defining the high boundary of the mark map range;
    determining whether the address of the low mark map word is less than the address of the high mark map word; and
    responsive to determining that the address of the low mark map word is less than the address of the high mark map word:
        accessing the low mark map word to update a state of a partial set of bits among the total bits in the low mark map word using an atomic operation, wherein a marked state of a bit indicates a live object;
        accessing each map word arranged between the low mark map word and the high mark map word to set all bits in all mark map words arranged between the low mark map word and the high mark map word as marked using a non-atomic operation; and
        accessing the high map word to set in the high map word as marked a partial set of bits among the total bits.

8. The computer-readable storage medium of claim 7, the method further comprising:
    determining whether the address of the low mark map word is equal to the address of the high mark map word; and
    accessing the low map word to set each bit in the low map word as marked responsive to determining that the address of the low mark map word is equal to the address of the high mark map word.

9. The computer-readable storage medium of claim 7, wherein the garbage collection cycle runs concurrently with the application program.

10. The computer-readable storage medium of claim 7, wherein the garbage collection cycle occasionally interrupts operation of the application program so as to run portions of the garbage collection cycle.

11. The computer-readable storage medium of claim 7, the method further comprising allocating the newly created objects within a heap.

12. The computer-readable storage medium of claim 7, the method further comprising marking via a modified write barrier that operates according to a snap-shot technique, newly allocated objects as live during the garbage collection cycle.

13. A system that keeps newly allocated objects alive in a snap-shot-at-the-beginning (SATB) garbage collection operation, the system comprising:
- a computing network including a processing device in communication with one or more computer memory storage devices; and
- the computing network further configured to implement a method, the method further including:
  - running a garbage collection cycle in conjunction with an application program;
  - tracing live objects during the garbage collection cycle by utilizing a mark map to identify the live objects, each object being associated with a bit in the mark map, and keeping alive the newly created objects during the step of tracing live objects
  - populating an allocation cache with a memory chunk having a low address and a high address defining the memory chunk having a plurality of objects stored contiguously, the populating including marking and tracking newly created objects during an allocation cache population phase of the garbage collection cycle, the newly created objects being created during the garbage collection cycle, and the allocation cache population phase of the garbage collection cycle including populating the allocation cache with cells from a heap allocation system;
  - calculating an address of a low mark map word corresponding to the low address of the memory chunk and a position of a low mark map bit within the low mark map word, the low mark map bit defining the low boundary of the mark map range;
  - calculating an address of a high mark map word corresponding to the high address of the memory chunk and a position of a high mark map bit within the low mark map word, the high mark map bit defining the high boundary of the mark map range;
  - determining whether the address of the low mark map word is less than the address of the high mark map word; and
  - responsive to determining that the address of the low mark map word is less than the address of the high mark map word:
    - accessing the low mark map word to update a state of a partial set of bits among the total bits in the low mark map word using an atomic operation, wherein a marked state of a bit indicates a live object;
    - accessing each map word arranged between the low mark map word and the high mark map word to set all bits in all mark map words arranged between the low mark map word and the high mark map word as marked using a non-atomic operation; and
    - accessing the high map word to set a partial set of bits among the total bits in the high map word as marked.

14. The system of claim 13, the method further comprising:
- determining whether the address of the low mark map word is equal to the address of the high mark map word; and
- accessing the low map word to set each bit in the low map word as marked responsive to determining that the address of the low mark map word is equal to the address of the high mark map word.

15. The system of claim 13, wherein the garbage collection cycle runs concurrently with the application program.

16. The system of claim 13, wherein the garbage collection cycle occasionally interrupts operation of the application program so as to run portions of the garbage collection cycle.

17. The system of claim 13, the method further comprising allocating the newly created objects within a heap.

18. The system of claim 13, the method further comprising marking, via a modified write barrier that operates according to a snap-shot technique, newly allocated objects as live during the garbage collection cycle.

* * * * *